(12) United States Patent
Sheydayi (10) Patent No.: US 7,140,393 B2
(45) Date of Patent: Nov. 28, 2006

(54) NON-CONTACT SHUTTLE VALVE FOR FLOW DIVERSION IN HIGH PRESSURE SYSTEMS

(75) Inventor: Alexei Sheydayi, Gilbert, AZ (US)

(73) Assignee: Tokyo Electron Limited, Tokyo (JP)

( * ) Notice: Subject to any disclaimer, the term of this patent is extended or adjusted under 35 U.S.C. 154(b) by 27 days.

(21) Appl. No.: 11/021,834

(22) Filed: Dec. 22, 2004

(65) Prior Publication Data

US 2006/0130913 A1    Jun. 22, 2006

(51) Int. Cl.
*F16K 11/044* (2006.01)
(52) U.S. Cl. .................. 137/875; 137/625.44
(58) Field of Classification Search ............... 137/864, 137/870, 875, 625.44
See application file for complete search history.

(56) References Cited

U.S. PATENT DOCUMENTS

| | | | |
|---|---|---|---|
| 2,617,719 A | 11/1952 | Stewart | 23/312 |
| 2,625,886 A | 1/1953 | Browne | 103/150 |
| 2,750,960 A * | 6/1956 | Hansen et al. | 137/864 |
| 3,108,613 A * | 10/1963 | Bochan | 137/863 |
| 3,215,162 A * | 11/1965 | Carver | 137/625.44 |
| 3,605,780 A * | 9/1971 | Kranz | 137/875 |
| 3,744,660 A | 7/1973 | Gaines et al. | 220/10 |
| 3,968,885 A | 7/1976 | Hassan et al. | 214/1 BC |
| 4,029,517 A | 6/1977 | Rand | 134/11 |
| 4,091,643 A | 5/1978 | Zucchini | 68/18 C |
| 4,245,154 A | 1/1981 | Uehara et al. | 250/227 |
| 4,341,592 A | 7/1982 | Shortes et al. | 156/643 |
| 4,355,937 A | 10/1982 | Mack et al. | 414/217 |
| 4,367,140 A | 1/1983 | Wilson | 210/110 |
| 4,406,596 A | 9/1983 | Budde | 417/393 |
| 4,422,651 A | 12/1983 | Platts | 277/206 R |
| 4,474,199 A | 10/1984 | Blaudszun | 134/105 |
| 4,522,788 A | 6/1985 | Sitek et al. | 422/78 |
| 4,549,467 A | 10/1985 | Wilden et al. | 91/307 |
| 4,592,306 A | 6/1986 | Gallego | 118/719 |
| 4,601,181 A | 7/1986 | Privat | 68/18 C |
| 4,626,509 A | 12/1986 | Lyman | 435/287 |
| 4,670,126 A | 6/1987 | Messer et al. | 204/298 |

(Continued)

FOREIGN PATENT DOCUMENTS

CH          251213          8/1948

(Continued)

OTHER PUBLICATIONS

J. B. Rubin et al., A Comparison of Chilled DI Water/Ozone and $CO_2$-based Supercritical Fluids as Replacements for Photoresist-Stripping Solvents, IEEE/CPMT Int'l Electronics Manufacturing Technology Symposium, pp. 308-314, 1998.

(Continued)

*Primary Examiner*—John Fox
(74) *Attorney, Agent, or Firm*—Wood, Herron & Evans, L.L.P.

(57) ABSTRACT

A valve for redirecting flow in a supercritical fluid or other high pressure processing system is disclosed. In high pressure supercritical carbon dioxide (SCCO2) equipment for semiconductor wafer processing, a major hurtle in providing clean equipment and clean wafers. A clean flow diverting valve is provided having no grease or other contaminants, and having no rubbing seal surfaces, but rather incorporates a magnetically coupled valve actuator to move a ball or other valve seat for diverting flow between a common port and alternative switched ports in a non-rubbing, non-contact manner. The valve is useful in semiconductor wafer high pressure processing tools for redirecting flow from a common inlet to alternative outlets or for admitting flow from alternative inlets to a common outlet.

1 Claim, 5 Drawing Sheets

U.S. PATENT DOCUMENTS

| | | | |
|---|---|---|---|
| 4,682,937 A | 7/1987 | Credle, Jr. .................. 417/393 |
| 4,693,777 A | 9/1987 | Hazano et al. .............. 156/345 |
| 4,749,440 A | 6/1988 | Blackwood et al. ........ 156/646 |
| 4,778,356 A | 10/1988 | Hicks ......................... 417/397 |
| 4,788,043 A | 11/1988 | Kagiyama et al. .......... 422/292 |
| 4,789,077 A | 12/1988 | Noe ........................... 220/319 |
| 4,823,976 A | 4/1989 | White, III et al. .......... 220/211 |
| 4,825,808 A | 5/1989 | Takahashi et al. .......... 118/719 |
| 4,827,867 A | 5/1989 | Takei et al. .................... 118/64 |
| 4,838,476 A | 6/1989 | Rahn ....................... 228/180.1 |
| 4,865,061 A | 9/1989 | Fowler et al. .............. 134/108 |
| 4,879,431 A | 11/1989 | Bertoncini .................. 435/311 |
| 4,917,556 A | 4/1990 | Stark et al. ................. 414/217 |
| 4,924,892 A | 5/1990 | Kiba et al. .................. 134/123 |
| 4,944,837 A | 7/1990 | Nishikawa et al. ......... 156/646 |
| 4,951,601 A | 8/1990 | Maydan et al. ............. 118/719 |
| 4,960,140 A | 10/1990 | Ishijima et al. ............... 134/31 |
| 4,983,223 A | 1/1991 | Gessner ..................... 134/25.4 |
| 5,011,542 A | 4/1991 | Weil ............................. 134/38 |
| 5,013,366 A | 5/1991 | Jackson et al. ................. 134/1 |
| 5,044,871 A | 9/1991 | Davis et al. ................. 414/786 |
| 5,062,770 A | 11/1991 | Story et al. ................... 417/46 |
| 5,068,040 A | 11/1991 | Jackson ...................... 210/748 |
| 5,071,485 A | 12/1991 | Matthews et al. ............. 134/2 |
| 5,105,556 A | 4/1992 | Kurokawa et al. ............. 34/12 |
| 5,143,103 A | 9/1992 | Basso et al. ................ 134/98.1 |
| 5,167,716 A | 12/1992 | Boitnott et al. ............. 118/719 |
| 5,169,296 A | 12/1992 | Wilden ....................... 417/395 |
| 5,169,408 A | 12/1992 | Biggerstaff et al. ........ 29/25.01 |
| 5,185,296 A | 2/1993 | Morita et al. ............... 437/229 |
| 5,186,594 A | 2/1993 | Toshima et al. ............. 414/217 |
| 5,186,718 A | 2/1993 | Tepman et al. ............. 29/25.01 |
| 5,188,515 A | 2/1993 | Horn ............................ 417/63 |
| 5,190,373 A | 3/1993 | Dickson et al. ............. 366/146 |
| 5,191,993 A | 3/1993 | Wanger et al. .............. 220/333 |
| 5,193,560 A | 3/1993 | Tanaka et al. ............. 134/56 R |
| 5,195,878 A | 3/1993 | Sahiavo et al. ............. 417/393 |
| 5,213,485 A | 5/1993 | Wilden ....................... 417/393 |
| 5,213,619 A | 5/1993 | Jackson et al. ................. 134/1 |
| 5,215,592 A | 6/1993 | Jackson ......................... 134/1 |
| 5,217,043 A | 6/1993 | Novakovi .................... 137/460 |
| 5,221,019 A | 6/1993 | Pechacek et al. ........... 220/315 |
| 5,222,876 A | 6/1993 | Budde ........................ 417/393 |
| 5,224,504 A | 7/1993 | Thompson et al. .......... 134/155 |
| 5,236,669 A | 8/1993 | Simmons et al. ........... 422/113 |
| 5,237,824 A | 8/1993 | Pawliszyn ................... 62/51.1 |
| 5,240,390 A | 8/1993 | Kvinge et al. .............. 417/393 |
| 5,243,821 A | 9/1993 | Schuck et al. .............. 62/50.6 |
| 5,246,500 A | 9/1993 | Samata et al. .............. 118/719 |
| 5,251,776 A | 10/1993 | Morgan, Jr. et al. ........ 220/360 |
| 5,267,455 A | 12/1993 | Dewees et al. ............... 68/5 C |
| 5,280,693 A | 1/1994 | Heudecker ................... 53/306 |
| 5,285,352 A | 2/1994 | Pastore et al. .............. 361/707 |
| 5,288,333 A | 2/1994 | Tanaka et al. ................ 134/31 |
| 5,304,515 A | 4/1994 | Morita et al. ............... 437/231 |
| 5,306,350 A | 4/1994 | Hoy et al. ................. 134/22.14 |
| 5,313,965 A | 5/1994 | Palen ............................ 134/61 |
| 5,314,574 A | 5/1994 | Takahashi ................... 156/646 |
| 5,316,591 A | 5/1994 | Chao et al. ................... 134/34 |
| 5,328,722 A | 7/1994 | Ghanayem et al. ......... 427/250 |
| 5,337,446 A | 8/1994 | Smith et al. .................. 15/21.1 |
| 5,339,844 A | 8/1994 | Stanford, Jr. et al. ....... 134/107 |
| 5,355,901 A | 10/1994 | Mielnik et al. .............. 134/105 |
| 5,368,171 A | 11/1994 | Jackson ...................... 134/147 |
| 5,370,740 A | 12/1994 | Chao et al. .................... 134/1 |
| 5,370,741 A | 12/1994 | Bergman ....................... 134/3 |
| 5,377,705 A | 1/1995 | Smith, Jr. et al. .......... 134/95.3 |
| 5,401,322 A | 3/1995 | Marshall ...................... 134/13 |
| 5,403,621 A | 4/1995 | Jackson et al. ........... 427/255.1 |
| 5,404,894 A | 4/1995 | Shiraiwa ..................... 134/66 |
| 5,412,958 A | 5/1995 | Iliff et al. .................... 68/5 C |
| 5,417,768 A | 5/1995 | Smith, Jr. et al. ............. 134/10 |
| 5,433,334 A | 7/1995 | Reneau ....................... 220/319 |
| 5,447,294 A | 9/1995 | Sakata et al. ................ 266/257 |
| 5,456,759 A | 10/1995 | Stanford, Jr. et al. ............ 134/1 |
| 5,494,526 A | 2/1996 | Paranjpe ......................... 134/1 |
| 5,500,081 A | 3/1996 | Bergman ................... 156/646.1 |
| 5,501,761 A | 3/1996 | Evans et al. ................. 156/344 |
| 5,503,176 A | 4/1996 | Dummire et al. .............. 137/15 |
| 5,505,219 A | 4/1996 | Lansberry et al. ........... 134/105 |
| 5,509,431 A | 4/1996 | Smith, Jr. et al. .......... 134/95.1 |
| 5,522,938 A | 6/1996 | O'Brien ........................ 134/1 |
| 5,526,834 A | 6/1996 | Mielnik et al. .............. 134/105 |
| 5,533,538 A | 7/1996 | Marshall ................... 134/104.4 |
| 5,236,602 A | 8/1996 | Jackson ....................... 210/748 |
| 5,571,330 A | 11/1996 | Kyogoku .................... 118/719 |
| 5,589,224 A | 12/1996 | Tepman et al. ........... 427/248.1 |
| 5,621,982 A | 4/1997 | Yamashita et al. ............ 34/203 |
| 5,629,918 A | 5/1997 | Ho et al. ..................... 369/112 |
| 5,644,855 A | 7/1997 | McDermott et al. .......... 34/516 |
| 5,649,809 A | 7/1997 | Stapelfeldt .................... 417/63 |
| 5,656,097 A | 8/1997 | Olesen et al. ................... 134/1 |
| 5,669,251 A | 9/1997 | Townsend et al. ............. 68/58 |
| 5,672,204 A | 9/1997 | Habuka ...................... 117/204 |
| 5,683,977 A | 11/1997 | Jureller et al. .............. 510/286 |
| 5,702,228 A | 12/1997 | Tamai et al. ............... 414/744.5 |
| 5,706,319 A | 1/1998 | Holtz .......................... 376/203 |
| 5,746,008 A | 5/1998 | Yamashita et al. ............ 34/211 |
| 5,769,588 A | 6/1998 | Toshima et al. ............. 414/217 |
| 5,797,719 A | 8/1998 | James et al. .................. 417/46 |
| 5,798,126 A | 8/1998 | Fujikawa et al. ............. 425/78 |
| 5,817,178 A | 10/1998 | Mita et al. .................. 118/666 |
| 5,868,856 A | 2/1999 | Douglas et al. ................ 134/2 |
| 5,868,862 A | 2/1999 | Douglas et al. .............. 134/26 |
| 5,881,577 A | 3/1999 | Sauer et al. ...................... 68/5 |
| 5,882,165 A | 3/1999 | Maydan et al. .............. 414/217 |
| 5,888,050 A | 3/1999 | Fitzgerald et al. ............ 417/46 |
| 5,898,727 A | 4/1999 | Fujikawa et al. ............ 373/110 |
| 5,900,107 A | 5/1999 | Murphy et al. .............. 156/359 |
| 5,900,354 A | 5/1999 | Batchelder ................... 430/395 |
| 5,904,737 A | 5/1999 | Preston et al. .................. 8/158 |
| 5,906,866 A | 5/1999 | Webb ......................... 427/534 |
| 5,908,510 A | 6/1999 | McCullough et al. ........... 134/2 |
| 5,928,389 A | 7/1999 | Jevtic ........................ 29/25.01 |
| 5,932,100 A | 8/1999 | Yager et al. ................. 210/634 |
| 5,934,856 A | 8/1999 | Asakawa et al. ............ 414/217 |
| 5,934,991 A | 8/1999 | Rush ........................... 454/187 |
| 5,955,140 A | 9/1999 | Smith et al. ................... 427/96 |
| 5,967,187 A * | 10/1999 | Horne et al. ................ 137/875 |
| 5,975,492 A | 11/1999 | Brenes ........................ 251/175 |
| 5,976,264 A | 11/1999 | McCullough et al. ........... 134/2 |
| 5,979,306 A | 11/1999 | Fujikawa et al. ............. 100/90 |
| 5,980,648 A | 11/1999 | Adler ............................ 134/34 |
| 5,981,399 A | 11/1999 | Kawamura et al. ......... 438/715 |
| 5,989,342 A | 11/1999 | Ikede et al. ................... 118/52 |
| 6,005,226 A | 12/1999 | Aschner et al. .............. 219/390 |
| 6,017,820 A | 1/2000 | Ting et al. ................... 438/689 |
| 6,024,801 A | 2/2000 | Wallace et al. ................. 134/1 |
| 6,029,371 A | 2/2000 | Kamikawa et al. ............ 34/516 |
| 6,035,871 A | 3/2000 | Eui-Yeol ....................... 134/61 |
| 6,037,277 A | 3/2000 | Masakara et al. ........... 438/787 |
| 6,053,348 A | 4/2000 | Morch ......................... 220/263 |
| 6,056,008 A | 5/2000 | Adams et al. ............. 137/487.5 |
| 6,067,728 A | 5/2000 | Farmer et al. ................. 34/470 |
| 6,077,053 A | 6/2000 | Fujikawa et al. ............ 417/399 |
| 6,077,321 A | 6/2000 | Adachi et al. .............. 29/25.01 |
| 6,082,150 A | 7/2000 | Stucker ....................... 68/18 R |
| 6,085,935 A | 7/2000 | Malchow et al. ............ 220/813 |
| 6,097,015 A | 8/2000 | McCullough et al. ....... 219/686 |
| 6,110,232 A | 8/2000 | Chen et al. ................. 29/25.01 |
| 6,122,566 A | 9/2000 | Nguyen et al. .............. 700/218 |
| 6,128,830 A | 10/2000 | Bettcher et al. ............... 34/404 |
| 6,145,519 A | 11/2000 | Konishi et al. ............. 134/95.2 |
| 6,149,828 A | 11/2000 | Vaartstra ....................... 216/57 |

| | | | |
|---|---|---|---|
| 6,159,295 A | 12/2000 | Maskara et al. ............ 118/688 |
| 6,164,297 A | 12/2000 | Kamikawa ................... 134/61 |
| 6,186,722 B1 | 2/2001 | Shirai ......................... 414/217 |
| 6,203,582 B1 | 3/2001 | Berner et al. .............. 29/25.01 |
| 6,216,364 B1 | 4/2001 | Tanaka et al. ................ 34/448 |
| 6,228,563 B1 | 5/2001 | Starov et al. ................ 430/327 |
| 6,235,634 B1 | 5/2001 | White et al. ................. 438/680 |
| 6,239,038 B1 | 5/2001 | Wen ............................ 438/745 |
| 6,241,825 B1 | 6/2001 | Wytman ...................... 118/733 |
| 6,242,165 B1 | 6/2001 | Vaartstra ..................... 430/329 |
| 6,244,121 B1 | 6/2001 | Hunter ...................... 73/865.9 |
| 6,251,250 B1 | 6/2001 | Keigler ......................... 205/89 |
| 6,277,753 B1 | 8/2001 | Mullee et al. ............. 438/692 |
| 6,286,231 B1 | 9/2001 | Bergman et al. ............. 34/410 |
| 6,305,677 B1 | 10/2001 | Lenz ............................ 269/13 |
| 6,306,564 B1 | 10/2001 | Mullee |
| 6,319,858 B1 | 11/2001 | Lee et al. ................... 438/787 |
| 6,334,266 B1 | 1/2002 | Moritz et al. ................ 34/337 |
| 6,344,174 B1 | 2/2002 | Miller et al. ................. 422/98 |
| 6,355,072 B1 | 3/2002 | Racette et al. ................. 8/142 |
| 6,388,317 B1 | 5/2002 | Reese ......................... 257/713 |
| 6,389,677 B1 | 5/2002 | Lenz ............................ 29/559 |
| 6,418,956 B1 | 7/2002 | Bloom ......................... 137/14 |
| 6,436,824 B1 | 8/2002 | Chooi et al. ................ 438/687 |
| 6,454,519 B1 | 9/2002 | Toshima et al. ............ 414/805 |
| 6,454,945 B1 | 9/2002 | Weigl et al. ................ 210/634 |
| 6,464,790 B1 | 10/2002 | Sherstinsky et al. ........ 118/715 |
| 6,508,259 B1 | 1/2003 | Tseronis et al. ............ 134/105 |
| 6,509,141 B1 | 1/2003 | Mullee |
| 6,521,466 B1 | 2/2003 | Castrucci ........................ 438/5 |
| 6,541,278 B1 | 4/2003 | Morita et al. ................. 438/3 |
| 6,546,946 B1 | 4/2003 | Dunmire .................. 137/15.18 |
| 6,550,484 B1 | 4/2003 | Gopinath et al. ............ 134/1.2 |
| 6,558,475 B1 | 5/2003 | Jur et al. ....................... 134/21 |
| 6,561,213 B1 | 5/2003 | Wang et al. ................ 137/263 |
| 6,561,220 B1 | 5/2003 | McCullough et al. .. 137/565.12 |
| 6,561,481 B1 | 5/2003 | Filonczuk .............. 251/129.12 |
| 6,561,767 B1 | 5/2003 | Berger et al. ................ 417/53 |
| 6,564,826 B1 | 5/2003 | Shen ...................... 137/505.18 |
| 6,802,961 B1 | 10/2004 | Jackson ........................ 210/86 |
| 6,848,667 B1 * | 2/2005 | Wygnanski ................... 251/65 |
| 6,890,853 B1 | 5/2005 | Biberger et al. ............ 438/670 |
| 2002/0046707 A1 | 4/2002 | Biberger et al. |
| 2003/0198895 A1 | 10/2003 | Toma et al. |
| 2004/0020518 A1 | 2/2004 | DeYoung et al. ............. 134/30 |
| 2004/0112409 A1 | 6/2004 | Schilling |
| 2004/0177867 A1 | 9/2004 | Schilling |
| 2005/0077597 A1 | 4/2005 | Toma et al. |

FOREIGN PATENT DOCUMENTS

| | | |
|---|---|---|
| DE | 36 08 783 A1 | 9/1987 |
| DE | 39 04 514 C2 | 3/1990 |
| DE | 40 04 111 C2 | 8/1990 |
| DE | 39 06 724 C2 | 9/1990 |
| DE | 39 06 735 C2 | 9/1990 |
| DE | 39 06 737 A1 | 9/1990 |
| DE | 44 29 470 A1 | 3/1995 |
| DE | 43 44 021 A1 | 6/1995 |
| DE | 198 60 084 A1 | 7/2000 |
| EP | 0 244 951 A2 | 11/1987 |
| EP | 02 72 141 A2 | 6/1988 |
| EP | 0 283 740 A2 | 9/1988 |
| EP | 0 302 345 A2 | 2/1989 |
| EP | 0 370 233 A1 | 5/1990 |
| EP | 0 391 035 A2 | 10/1990 |
| EP | 0 453 867 A1 | 10/1991 |
| EP | 0 518 653 B1 | 12/1992 |
| EP | 0 536 752 A2 | 4/1993 |
| EP | 0 572 913 A1 | 12/1993 |
| EP | 0 587 168 A1 | 3/1994 |
| EP | 0 620 270 A3 | 10/1994 |
| EP | 0 679 753 B1 | 11/1995 |
| EP | 0 711 864 B1 | 5/1996 |
| EP | 0 726 099 A2 | 8/1996 |
| EP | 0 727 711 A2 | 8/1996 |
| EP | 0 822 583 A2 | 2/1998 |
| EP | 0 829 312 A2 | 3/1998 |
| EP | 0 836 895 A2 | 4/1998 |
| EP | 0 903 775 A2 | 3/1999 |
| FR | 1 499 491 | 9/1967 |
| GB | 2 003 975 | 3/1979 |
| GB | 2 193 482 | 2/1988 |
| JP | 60-192333 | 9/1985 |
| JP | 60-2348479 | 11/1985 |
| JP | 60-246635 | 12/1985 |
| JP | 61-017151 | 1/1986 |
| JP | 61-231166 | 10/1986 |
| JP | 62-125619 | 6/1987 |
| JP | 63-303059 | 12/1988 |
| JP | 1-045131 | 2/1989 |
| JP | 1-246835 | 10/1989 |
| JP | 2-148841 | 6/1990 |
| JP | 2-209729 | 8/1990 |
| JP | 2-304941 | 12/1990 |
| JP | 7-142333 | 6/1995 |
| JP | 8-186140 A | 7/1996 |
| JP | 8-222508 A | 8/1996 |
| JP | 10-144757 A | 5/1998 |
| JP | 56-142629 | 11/1998 |
| JP | 10335408 A | 12/1998 |
| JP | 11-200035 | 7/1999 |
| JP | 2000-106358 | 4/2000 |
| WO | WO 87/07309 | 12/1987 |
| WO | WO 90/06189 | 6/1990 |
| WO | WO 90/13675 | 11/1990 |
| WO | WO 91/12629 A | 8/1991 |
| WO | WO 93/14255 | 7/1993 |
| WO | WO 93/14259 | 7/1993 |
| WO | WO 93/20116 | 10/1993 |
| WO | WO 96/277704 | 9/1996 |
| WO | WO 99/18603 A | 4/1999 |
| WO | WO 99/49998 | 10/1999 |
| WO | WO 00/36635 | 6/2000 |
| WO | WO 00/73241 A1 | 12/2000 |
| WO | WO 01/10733 A1 | 2/2001 |
| WO | WO 01/33615 A3 | 5/2001 |
| WO | WO 01/55628 A1 | 8/2001 |
| WO | WO 01/68279 A2 | 9/2001 |
| WO | WO 01/74538 A1 | 10/2001 |
| WO | WO 01/78911 A1 | 10/2001 |
| WO | WO 01/85391 A2 | 11/2001 |
| WO | WO 01/94782 A2 | 12/2001 |
| WO | WO 02/09894 A2 | 2/2002 |
| WO | WO 02/11191 A2 | 2/2002 |
| WO | WO 02/16051 A2 | 2/2002 |
| WO | WO 03/030219 A2 | 10/2003 |

OTHER PUBLICATIONS

Los Alamos National Laboratory, Solid State Technology, pp. S10 & S14, Oct. 1998.

Supercritical Carbon Dioxide Resist Remover, SCORR, the Path to Least Photoresistance, Los Alamos National Laboratory, 1998.

Z. Guan et al., *Fluorocarbon-Based Heterophase Polymeric Materials. I. Block Copolymer Surfactants for Carbon Dioxide Applications*, Macromolecules, vol. 27, pp. 5527-5532, 1994.

*International Journal of Environmentally Conscious Design & Manufacturing*, vol. 2, No. 1, pp. 83, 1993.

Matson and Smith, *Supercritical Fluids*, Journal of the American Ceramic Society, vol. 72, No. 6, pp. 872-874.

D. H. Ziger et al., *Compressed Fluid Technology: Application to RIE Developed Resists*, AlChE Journal, vol. 33, No. 10, pp. 1585-1591, Oct. 1987.

Kirk-Othmer, *Alcohol Fuels to Toxicology*, Encyclopedia of Chemical Terminology, 3rd ed., Supplement Volume, New York: John Wiley & Sons, pp. 872-893, 1984.

*Cleaning with Supercritical $CO_2$*, NASA Tech Briefs, MFS-29611, Marshall Space Flight Center, Alabama, Mar. 1979.

N. Basta, *Supercritical Fluids: Still Seeking Acceptance*, Chemical Engineering vol. 92, No. 3, pp. 14, Feb. 24, 1985.

D. Takahashi, *Los Alamos Lab Finds Way to Cut Chip Toxic Waste*, Wall Street Journal, Jun. 22, 1998.

*Supercritical $CO_2$, Process Offers Less Mess from Semiconductor Plants*, Chemical Engineering Magazine, pp. 27 & 29, Jul. 1988.

Y. P. Sun, *Preparation of Polymer Protected Semiconductor Nanoparticles Through the Rapid Expansion of Supercritical Fluid Solution*, Chemical Physics Letters, pp. 585-588, May 22, 1998.

K. Jackson et al., *Surfactants and Micromulsions in Supercritical Fluids*, Supercritical Fluid Cleaning, Noyes Publications, Westwood, NJ, pp. 87-120, Spring 1998.

M. Kryszcwski, *Production of Metal and Semiconductor Nanoparticles in Polymer Systems*, Polimery, pp. 65-73, Feb. 1998.

G. L. Bakker et al., *Surface Cleaning and Carbonaceous Film Removal Using High Pressure, High Temperature Water, and Water/$CO_2$ Mixtures*, J Electrochem Soc., vol. 145, No. 1, pp. 284-291, Jan. 1998.

C. K. Ober et al., *Imaging Polymers with Supercritical Carbon Dioxide*, Advanced Materials, vol. 9, No. 13, pp. 1039-1043, Nov. 3, 1997.

E. M. Russick et al., *Supercritical Carbon Dioxide Extraction of Solvent from Micro-Machined Structures*, Supercritical Fluids Extraction and Pollution Prevention, ACS Symposium Series, vol. 670, pp. 255-269, Oct. 21, 1997.

N. Dahmen et al., *Supercritical Fluid Extraction of Grinding and Metal Cutting Waste Contaminated with Oils*, Supercritical Fluids—Extraction and Pollution Prevention, ACS Symposium Series, vol. 670, pp. 270-279, Oct. 21, 1997.

C. M. Wai, *Supercritical Fluid Extraction: Metals as Complexes*, Journal of Chromatography A, vol. 785, pp. 369-383, Oct. 17, 1997.

C. Xu et al., *Submicron-Sized Spherical Yttrium Oxide Based Phosphors Prepared by Supercritical $CO_2$-Assisted Nerosolization in Pyrolysis*, Appl. Phys. Lett, vol. 71, No. 22, pp. 1643-1645, Sep. 22, 1997.

Y. Tomioka et al., *Decomposition of Tetramethylammonium (TMA) in a Positive Photo-resist Developer by Supercritical Water*, Abstracts of Papers 214th ACS Natl Meeting. American Chemical Society, Abstract No. 108, Sep. 7, 1997.

H. Klein et al., *Cyclic Organic Carbonates Serve as Solvents and Reactive Diluents*, Coatings World, pp. 38-40, May 1997.

J. Bühler et al., *Linear Array of Complementary Metal Oxide Semiconductor Double-Pass Metal Micro-mirrors*, Opt. Eng. vol. 36, No. 5, pp. 1391-1398, May 1997.

M. H. Jo et al., *Evaluation of $SiO_2$ Aerogel Thin Film with Ultra Low Dielectric Constant as an Intermetal Dielectric*, Microelectronic Engineering, vol. 33, pp. 343-348, Jan. 1997.

J. B. McClain et al., *Design of Nonionic Surfactants for Supercritical Carbon Dioxide*, Science, vol. 274, pp. 2049-2052, Dec. 20, 1996.

L. Znaidi et al., *Batch and Semi-Continuous Synthesis of Magnesium Oxide Powders from Hydrolysis and Supercritical Treatment of $Mg(OCH)_2$*, Materials Research Bulletin, vol. 31, No. 12, pp. 1527-1535, Dec. 1996.

M. E. Tadros, Synthesis of Titanium Dioxide Particles in Supercritical $CO_2$, J. Supercritical Fluids, vol. 9, pp. 172-176, Sep. 1996.

V. G. Courtecuisse et al., Kinetics of the Titanium Isopropoxide Decomposition in Supercritical Isopropyl Alcohol Ind. Eng. Chem. Res., vol. 35, No. 8, pp. 2539-2545, Aug. 1996.

A. Garbor et al., Block and Random Copolymer Resists Designed for 193 nm Lithography and Environmentally Friendly Supercritical $CO_2$Development, SPIE, vol. 2724, pp. 410-417, Jun. 1996.

G. L. Schimek et al., Supercritical Ammonia Synthesis and Characterization of Four New Alkali Metal Silver Antimony Sulfides . . . , J. Solid State Chemistry, vol. 123, pp. 277-284, May 1996.

P. Gallagher-Wetmore et al., Supercritical Fluid Processing: Opportunities for New Resist Materials and Processes, SPIE, vol. 2725, pp. 289-299, Apr. 1996.

K. I. Papathomas et al., Debonding of Photoresists by Organic Solvents, J. Applied Polymer Science, vol. 59, pp. 2029-2037, Mar. 28, 1996.

J. J. Watkins et al., Polymer/Metal Nanocomposite Synthesis in Supercritical $CO_2$, Chemistry of Materials, vol. 7, No. 11, pp. 1991-1994, Nov. 1995.

E. F. Gloyna et al., Supercritical Water Oxidation Research and Development Update, Environmental Progress, vol. 14, No. 3, pp. 182-192, Aug. 1995.

P. Gallagher-Wetmore et al., Supercritical Fluid Processing: A New Dry Technique for Photoresist Developing, SPIE, vol. 2438, pp. 694-708, Jun. 1995.

A. H. Gabor et al., Silicon-Containing Block Copolymer Resist Materials, Microelectronics Technology—Polymers for Advanced Imaging and Packaging, ACS Symposium Series, vol. 615, pp. 281-298, Apr. 1995.

P. C. Tsiartas et al., Effect of Molecular Weight Distribution on the Dissolution Properties of Novolac Blends, SPIE, vol. 2438, pp. 264-271, Jun. 1995.

R. D. Allen et al., Performance Properties of Near-Monodisperse Novolak Resins, SPIE, vol. 2438, pp. 250-260, Jun. 1995.

P. T. Wood et al., *Synthesis of New Channeled Structures in Supercritical Amines* . . . , Inorg. Chem., vol. 33, pp. 1556-1558, 1994.

J. B. Jerome et al., *Synthesis of New Low-Dimensional Quaternary Compounds* . . . , Inorg. Chem., vol. 33, pp. 1733-1734, 1994.

J. McHardy et al., *Progress in Supercritical $CO_2$ Cleaning*, SAMPE Jour, vol. 29, No. 5, pp. 20-27, Sep. 1993.

R. Purtell et al., *Precision Parts Cleaning Using Supercritical Fluids*, J. Vac. Sci. Technol. A., vol. 11, No. 4, pp. 1696-1701, Jul. 1993.

E. Bok et al., *Supercritical Fluids for Single Wafer Cleaning*, Solid State Technology, pp. 117-120, Jun. 1992.

T. Adschiri et al., *Rapid and Continuous Hydrothermal Crystallization of Metal Oxide Particles in Supercritical Wafer*, J. Am. Ceram. Cos., vol. 75, No. 4, pp. 1019-1022, 1992.

B.N. Hansen et al., *Supercritical Fluid Transport—Chemical Deposition of Films*, Chem. Mater, vol. 4, No. 4, pp. 749-752, 1992.

S. H. Page et al., *Predictability and Effect of Phase Behavior of $CO_2$/Propylene Carbonate in Supercritical Fluid Chromatography*, J. Microcol, vol. 3, No. 4, pp. 355-369, 1991.

T. Brokamp et al., *Synthese und Kristallstruktur Eines Gemischtvalenten Lithium-Tantainitride $Li_2$, $Ta_3$, $N_5$*, J. Alloys and Compounds, vol. 176, pp. 47-60, 1991.

B. M. Hybertson et al., *Deposition of Palladium Films by a Novel Supercritical Transport Chemical Deposition Process*, Mat. Res. Bull., vol. 26, pp. 1127-1133, 1991.

D. H. Ziger et al., *Compressed Fluid Technology: Application to RIE Developed Resists*, AlChE Journal, vol. 33, No. 10, pp. 1585-1591, Oct. 1987.

D. W. Matson et al., *Rapid Expansion of Supercritical Fluid Solutions: Solute Formation of Powders, Thin Films, and Fibers*, Ind. Eng. Chem. Res., vol. 26, No. 11, pp. 2298-2306, 1987.

W. K. Tolley et al., *Stripping Organics from Metal and Mineral Surfaces Using Supercritical Fluids*, Separation Science and Technology, vol. 22, pp. 1087-1101, 1987.

*Final Report on the Safety Assessment of Propylene Carbonate*, J. American College of Toxicology, vol. 6, No. 1, pp. 23-51, 1987.

*Porous Xerogel Films as Ultra-Low Premittivity Dielectrics for ULSI Interconnect Applications*, Materials Research Society, pp. 463-469, 1987.

Kawakami et al., *A Super Low-k(k=1.1) Silica Aerogel Film Using Supercritical Drying Technique*, IEEE, pp. 143-145, 2000.

R. F. Reidy, *Effects of Supercritical Processing on Ultra Low-k Films*, Texas Advanced Technology Program, Texas Instruments and the Texas Academy of Mathematics and Science.

Anthony Muscat, *Backend Processing Using Supercritical $CO_2$*, University of Arizona.

D. Goldfarb et al., *Aqueous-based Photoresist Drying Using Supercritical Carbon Dioxide to Prevent Pattern Collapse*, J. Vacuum Sci. Tech. B, vol. 18, No. 6, pp. 3313, 2000.

H. Namatsu et al., *Supercritical Drying for Water-Rinsed Resist Systems*, J. Vacuum Sci, Tech. B, vol. 18, No. 6, pp. 3308, 2000.

N. Sundararajan et al., *Supercritical $CO_2$ Processing for Submicron Imaging of Fluoropolymers*, Chem. Mater., vol. 12, 41, 2000.

Hideaki Itakura et al., *Multi-Chamber Dry Etching System*, Solid State Technology, pp. 209-214, Apr. 1982.

Joseph L. Foszez, *Diaphragm Pumps Eliminate Seal Problems*, Plant Engineering, pp. 1-5, Feb. 1, 1996.

Bob Agnew, *WILDEN Air-Operated Diaphragm Pumps*, Process & Industrial Technologies, Inc., 1996.

\* cited by examiner

NON-CONTACT SHUTTLE VALVE FOR FLOW DIVERSION IN HIGH PRESSURE SYSTEMS

This application is related to co-pending U.S. patent application Ser. No. 10/955,326, entitled "Method and System for Controlling a Velocity Field of a Supercritical Fluid in a Processing System", filed on Sep. 30, 2004. The entire content of this application is herein incorporated by reference.

FIELD OF THE INVENTION

The present invention relates to a method and apparatus for flowing a fluid in a processing system and, more particularly, to the diverting of processing fluid, for example of a supercritical processing fluid, and valve structure useful therefor.

DESCRIPTION OF RELATED ART

During the fabrication of semiconductor devices for integrated circuits (ICs), a critical processing requirement for processing semiconductor devices is cleanliness. The processing of semiconductor devices includes vacuum processing, such as etch and deposition processes whereby material is removed from or added to a substrate surface, as well as atmospheric processing, such as wet cleaning whereby contaminants or residue accumulated during processing are removed. For example, the removal of residue, such as photoresist (serving as a light-sensitive mask for etching), post-etch residue, and post-ash residue subsequent to the etching of features, such as trenches or vias, can utilize plasma ashing with an oxygen plasma followed by wet cleaning.

Other critical processing requirements for the processing of semiconductor devices include substrate throughput and reliability. Production processing of semiconductor devices in a semiconductor fabrication facility requires a large capital outlay for processing equipment. In order to recover these expenses and generate sufficient income from the fabrication facility, the processing equipment requires a specific substrate throughput and a reliable process in order to ensure the achievement of this throughput.

Until recently, plasma ashing and wet cleaning were found to be sufficient for removing residue and contaminants accumulated during semiconductor processing. However, recent advancements for ICs include a reduction in the critical dimension for etched features below a feature dimension acceptable for wet cleaning, such as a feature dimension below 45 to 65 nanometers, as well as the introduction of new materials, such as low dielectric constant (low-k) materials, which are susceptible to damage during plasma ashing.

Therefore, at present, interest has developed for the replacement of plasma ashing and wet cleaning. One interest includes the development of dry cleaning systems utilizing a supercritical fluid as a carrier for a solvent, or other residue removing composition. Post-etch and post-ash cleaning are examples of such systems. Other interests include other processes and applications that can benefit from the properties of supercritical fluids, particularly of substrates having features with a dimension of 65 nanometers (nm), or 45 nm, or smaller. Such processes and applications may include restoring low dielectric films after etching, sealing porous films, drying of applied films, depositing materials, as well as other processes and applications.

Certain challenges occur when attempting to process silicon wafers under high pressure. One such issue is how to switch flow direction or path within the equipment without generating particles. Typically, ball valves have been used for high flow rate applications, but these have many cleanliness issues including rubbing surfaces and trapped internal volumes. Plug valves have similar rubbing issues. Bellows valves, even if rated to high enough pressure, have many convoluted surfaces which can trap and release particles. Diaphragm valves have recently been the valve type of choice, due to their relatively clean construction, but flow rates are typically less than one-tenth that of comparable ball valves.

Typical pressures encountered in SCCO2 processing are a minimum of 1,031 psi, but 3,000 psi is not uncommon, and upwards of 10,000 psi has been reported in the literature. Some equipment configurations may require flow diversion, but not total shut-off. Within a high pressure tool, the differences within different sections of the tool may be quite low, maybe 10 to 100 psi. Internal pressure differences can exceed these pressures, but typically inline filters will limit the available pressure gradient possible within the tool.

Accordingly, there is a need for improved valving in supercritical fluid processing systems and other high pressure processing systems that will overcome the problems discussed above and more general problems of the prior art.

SUMMARY OF THE INVENTION

One object of the present invention is to reduce or eliminate any or all of the above-described problems.

Another object of the present invention is to provide a valve for switching high pressure fluid, particularly supercritical fluid, and more particularly supercritical carbon dioxide, in a semiconductor wafer processing system while generating fewer particulates than in prior systems.

A further object of the present invention is to provide a flow diversion valve having a moveable element and actuating the element without contact therewith.

According to one embodiment of the invention, a method and apparatus are provided incorporating magnetic coupling for diverting flow of high pressure processing fluid, particularly supercritical processing fluid, in a non-rubbing, non-contact manner in semiconductor wafer high pressure processing tools.

According to one embodiment of the invention, a valve for switching the flow of high pressure processing fluid between a common port and alternative switched ports in a semiconductor processing system is provided in which the valve comprises a valve body having a cavity therein, a common port coupled to the cavity and at least two switched ports coupled to the cavity. The valve element is moveable in the cavity between alternative positions. The alternative positions include a first position and a second position. At the first position, the element blocks flow of the high pressure fluid between the common port and a first one of the switched ports and permits flow of the high pressure fluid between the common port and a second one of the switched ports. At the second position, the element blocks flow of the high pressure fluid between the common port and the second one of the switched ports and permits flow of the high pressure fluid between the common port and the first one of the switched ports. At least two actuators are mounted on said valve body and magnetically coupled to said valve element. When activated in response to a control signal, a first actuator moves the element to the first position. When activated, the second element moves the element to the second position.

According to other embodiments of the invention, a high pressure fluid processing system is provided for processing semiconductor wafers. The system comprises a processing chamber, a high pressure fluid flow system coupled to the chamber and operative to flow high pressure processing fluid through the chamber and across a semiconductor wafer supported in the chamber, and a flow diverting valve and a controller. The flow diverting valve has a common port, at least two switched ports and a valve element moveable within the valve between alternative positions, including a first position at which flow of the high pressure fluid is directed between the common port and a first one of the switched ports and a second position at which flow of the high pressure fluid is directed between the common port and a second one of the switched ports. The valve has at least one actuator mounted thereon and magnetically coupled to said valve element. The actuator is operable, when activated in response to a control signal, to move the valve element between the alternative positions. The controller selectively communicates control signals to said actuators to cause the valve to switch.

According to another embodiment of the invention, a method of diverting the flow of a high pressure fluid processing fluid is provided in a high pressure fluid system for processing semiconductor wafers. The method comprises magnetically moving a valve element in a valve body to switch flow of the high pressure fluid between a common port and alternative switched ports and alternatively flowing the fluid in the processing system in through the valve in accordance with the position of the valve element.

DETAILED DESCRIPTION OF EXEMPLARY EMBODIMENTS

In the following description, to facilitate a thorough understanding of the invention and for purposes of explanation and not limitation, specific details are set forth, such as a particular geometry of the high pressure processing system and various descriptions of the internal members. However, it should be understood that the invention may be practiced with other embodiments that depart from these specific details.

Nonetheless, it should be appreciated that, contained within the description are features which, notwithstanding the inventive nature of the general concepts being explained, are also of an inventive nature.

Figure 1:
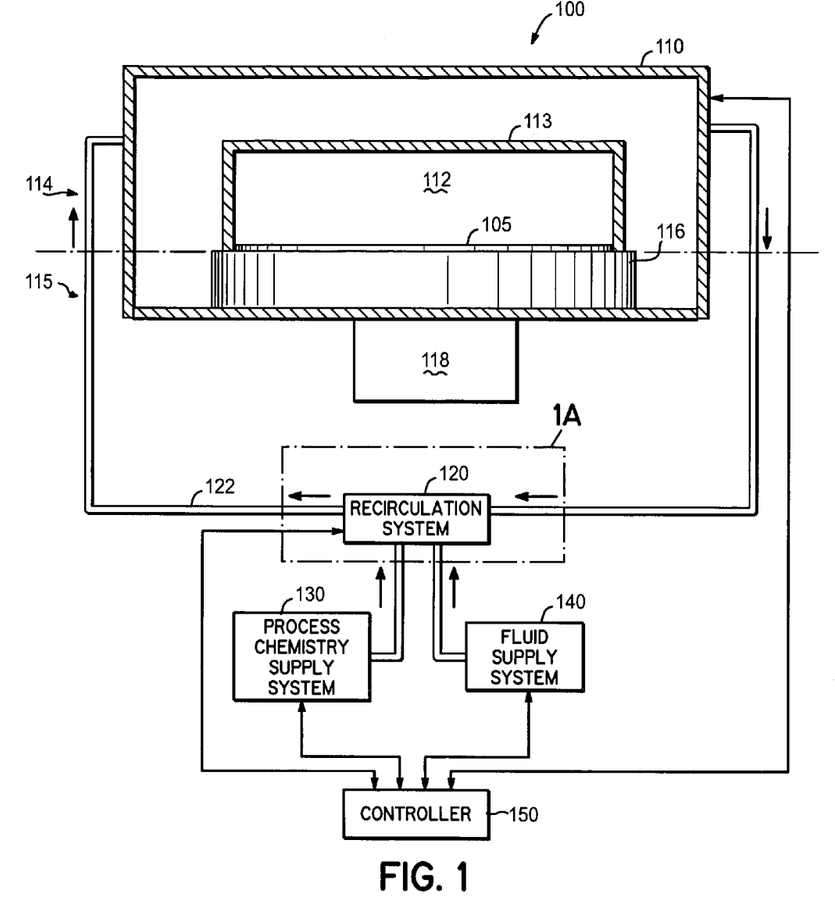
FIG. 1 presents a simplified schematic representation of a high pressure processing system in accordance with one embodiment of the invention.

Referring now to the drawings, wherein like reference numerals designate identical or corresponding parts throughout the several views, FIG. 1 illustrates a high pressure processing system 100 according to an embodiment of the invention. In the illustrated embodiment, high pressure processing system 100 comprises processing elements that include a processing chamber 110, a fluid flow system 120, a process chemistry supply system 130, a high pressure fluid supply system 140, and a controller 150, all of which are configured to process substrate 105. The controller 150 can be coupled to the processing chamber 110, the fluid flow system 120, the process chemistry supply system 130, and the high pressure fluid supply system 140. Alternately, or in addition, controller 150 can be coupled to a one or more additional controllers/computers (not shown), and controller 150 can obtain setup and/or configuration information from an additional controller/computer.

In FIG. 1, singular processing elements (110, 120, 130, 140, and 150) are shown, but this is not required for the invention. The high pressure processing system 100 can comprise any number of processing elements having any number of controllers associated with them in addition to independent processing elements.

The controller 150 can be used to configure any number of processing elements (110, 120, 130, and 140), and the controller 150 can collect, provide, process, store, and display data from processing elements. The controller 150 can comprise a number of applications for controlling one or more of the processing elements. For example, controller 150 can include a graphic user interface (GUI) component (not shown), that can provide easy to use interfaces that enable a user to monitor and/or control one or more processing elements.

Referring still to FIG. 1, the fluid flow system 120 is configured to flow fluid and chemistry from the supplies 130 and 140 through the processing chamber 110 via a flow line 122. The fluid flow system 120 is illustrated as a recirculation system through which the fluid and chemistry recirculate from and back to the processing chamber 110. This recirculation is most likely to be the preferred configuration for many applications, but this is not necessary to the invention. Fluids, particularly inexpensive fluids, can be passed through the processing chamber once and then discarded, which might be more efficient than reconditioning them for re-entry into the processing chamber. Accordingly, while the fluid flow system is described as a recirculating system in the exemplary embodiments, a non-recirculating system may, in some cases, be substituted. This fluid flow system or recirculation system 120 can include one or more valves for regulating the flow of a processing solution through the recirculation system 120 and through the processing chamber 110. The recirculation system 120 can comprise any number of back-flow valves, filters, pumps, and/or heaters for maintaining a specified temperature, pressure or both for the processing solution and flowing the process solution through the recirculation system 120 and through the processing chamber 110. Furthermore, any one of the many components provided within the fluid flow system 120 may be heated to a temperature consistent with the specified process temperature.

Referring still to FIG. 1, the processing system 100 can comprise high pressure fluid supply system 140. The high pressure fluid supply system 140 can be coupled to the recirculation system 120, but this is not required. In alternate embodiments, high pressure fluid supply system supply system 140 can be configured differently and coupled differently. For example, the fluid supply system 140 can be coupled directly to the processing chamber 110. The high pressure fluid supply system 140 can include a supercritical fluid supply system. A supercritical fluid as referred to herein is a fluid that is in a supercritical state, which is that state that exists when the fluid is maintained at or above the critical pressure and at or above the critical temperature on its phase diagram. In such a supercritical state, the fluid possesses certain properties, one of which is the substantial absence of surface tension. Accordingly, a supercritical fluid supply system, as referred to herein, is one that delivers to a processing chamber a fluid that assumes a supercritical state at the pressure and temperature at which the processing chamber is being controlled. Furthermore, it is only necessary that at least at or near the critical point the fluid is in substantially a supercritical state at which its properties are sufficient, and exist long enough, to realize their advantages in the process being performed. Carbon dioxide, for example, is a supercritical fluid when maintained at or above a pressure of about 1,070 Psi at a temperature of 31 degrees C.

As described above, the fluid supply system 140 can include a supercritical fluid supply system, which can be a carbon dioxide supply system. For example, the fluid supply system 140 can be configured to introduce a high pressure fluid having a pressure substantially near the critical pressure for the fluid. Additionally, the fluid supply system 140 can be configured to introduce a supercritical fluid, such as carbon dioxide in a supercritical state. Additionally, for example, the fluid supply system 140 can be configured to introduce a supercritical fluid, such as supercritical carbon dioxide, at a pressure ranging from approximately the critical pressure of carbon dioxide to 10,000 Psi. Examples of other supercritical fluid species useful in the broad practice of the invention include, but are not limited to, carbon dioxide (as described above), oxygen, argon, krypton, xenon, ammonia, methane, methanol, dimethyl ketone, hydrogen, and sulfur hexafluoride. The fluid supply system can, for example, comprise a carbon dioxide source (not shown) and a plurality of flow control elements (not shown) for generating a supercritical fluid. For example, the carbon dioxide source can include a CO2 feed system, and the flow control elements can include supply lines, valves, filters, pumps, and heaters. The fluid supply system 140 can comprise an inlet valve (not shown) that is configured to open and close to allow or prevent the stream of supercritical carbon dioxide from flowing into the processing chamber 110. For example, controller 150 can be used to determine fluid parameters such as pressure, temperature, process time, and flow rate.

Referring still to FIG. 1, the process chemistry supply system 130 is coupled to the recirculation system 120, but this is not required for the invention. In alternate embodiments, the process chemistry supply system 130 can be configured differently, and can be coupled to different elements in the processing system 100. The process chemistry is introduced by the process chemistry supply system 130 into the fluid introduced by the fluid supply system 140 at ratios that vary with the substrate properties, the chemistry being used and the process being performed in the processing chamber. Usually the ratio is roughly 1 to 5 percent by volume, which, for a chamber, recirculation system and associated plumbing having a volume of about one liter amounts to about 10 to 50 milliliters of additive in most cases, but the ratio may be higher or lower.

The process chemistry supply system 130 can be configured to introduce one or more of the following process compositions, but not limited to: cleaning compositions for removing contaminants, residues, hardened residues, photoresist, hardened photoresist, post-etch residue, post-ash residue, post chemical-mechanical polishing (CMP) residue, post-polishing residue, or post-implant residue, or any combination thereof; cleaning compositions for removing particulate; drying compositions for drying thin films, porous thin films, porous low dielectric constant materials, or air-gap dielectrics, or any combination thereof; film-forming compositions for preparing dielectric thin films, metal thin films, or any combination thereof; healing compositions for restoring the dielectric constant of low dielectric constant (low-k) films; sealing compositions for sealing porous films; or any combination thereof. Additionally, the process chemistry supply system 130 can be configured to introduce solvents, co-solvents, surfactants, film-forming precursors, or reducing agents, or any combination thereof.

The process chemistry supply system 130 can be configured to introduce N-Methyl Pyrrolidone (NMP), diglycol amine, hydroxyl amine, di-isopropyl amine, tri-isoprpyl amine, tertiary amines, catechol, ammonium fluoride, ammonium bifluoride, methylacetoacetamide, ozone, propylene glycol monoethyl ether acetate, acetylactone, dibasic esters, ethyl lactate, CHF3, BF3, HF, other fluorine containing chemicals, or any mixture thereof. Other chemicals such as organic solvents may be utilized independently or in conjunction with the above chemicals to remove organic materials. The organic solvents may include, for example, an alcohol, ether, and/or glycol, such as acetone, diacetone alcohol, dimethyl sulfoxide (DMSO), ethylene glycol, methanol, ethanol, propanol, or isopropanol (IPA). For further details, see U.S. Pat. No. 6,306,564B1, filed May 27, 1998, and titled "REMOVAL OF RESIST OR RESIDUE FROM SEMICONDUCTORS USING SUPERCRITICAL CARBON DIOXIDE", and U.S. Pat. No. 6,509,141B2, filed Sep. 3, 1999, and titled "REMOVAL OF PHOTORESIST AND PHOTORESIST RESIDUE FROM SEMICONDUCTORS USING SUPERCRITICAL CARBON DIOXIDE PROCESS," both incorporated by reference herein.

Additionally, the process chemistry supply system 130 can comprise a cleaning chemistry assembly (not shown) for providing cleaning chemistry for generating supercritical cleaning solutions within the processing chamber. The cleaning chemistry can include peroxides and a fluoride source. For example, the peroxides can include hydrogen peroxide, benzoyl peroxide, or any other suitable peroxide, and the fluoride sources can include fluoride salts (such as ammonium fluoride salts), hydrogen fluoride, fluoride adducts (such as organo-ammonium fluoride adducts), and combinations thereof. Further details of fluoride sources and methods of generating supercritical processing solutions with fluoride sources are described in U.S. patent application Ser. No. 10/442,557, filed May 20, 2003, and titled "TETRA-ORGANIC AMMONIUM FLUORIDE AND HF IN SUPERCRITICAL FLUID FOR PHOTORESIST AND RESIDUE REMOVAL", and U.S. patent application Ser. No. 10/321,341, filed Dec. 16, 2002, and titled "FLUORIDE IN SUPERCRITICAL FLUID FOR PHOTORESIST POLYMER AND RESIDUE REMOVAL," both incorporated by reference herein.

Furthermore, the process chemistry supply system 130 can be configured to introduce chelating agents, complexing agents and other oxidants, organic and inorganic acids that can be introduced into the supercritical fluid solution with one or more carrier solvents, such as N,N-dimethylacetamide (DMAc), gamma-butyrolactone (BLO), dimethyl sulfoxide (DMSO), ethylene carbonate (EC), N-methylpyrrolidone (NMP), dimethylpiperidone, propylene carbonate, and alcohols (such a methanol, ethanol and 2-propanol).

Moreover, the process chemistry supply system 130 can comprise a rinsing chemistry assembly (not shown) for providing rinsing chemistry for generating supercritical rinsing solutions within the processing chamber. The rinsing chemistry can include one or more organic solvents including, but not limited to, alcohols and ketone. In one embodiment, the rinsing chemistry can comprise sulfolane, also known as thiocyclopentane-1,1-dioxide; (Cyclo)tetramethylene sulphone; and 2,3,4,5-tetrahydrothiophene-1,1-dioxide; which can be purchased from a number of venders, such as Degussa Stanlow Limited, Lake Court, Hursley Winchester SO21 2LD UK.

Moreover, the process chemistry supply system 130 can be configured to introduce treating chemistry for curing, cleaning, healing, or sealing, or any combination thereof, low dielectric constant films (porous or non-porous). The chemistry can include hexamethyldisilazane (HMDS), chlorotrimethylsilane (TMCS), or trichloromethylsilane (TCMS). For further details, see U.S. patent application Ser. No. 10/682,196, filed Oct. 10, 2003, and titled "METHOD AND SYSTEM FOR TREATING A DIELECTRIC FILM," and U.S. patent application Ser. No. 10/379,984, filed Mar. 4, 2003, and titled "METHOD OF PASSIVATING LOW DIELECTRIC MATERIALS IN WAFER PROCESSING," both incorporated by reference herein.

The processing chamber 110 can be configured to process substrate 105 by exposing the substrate 105 to high pressure fluid from the high pressure fluid supply system 140, or process chemistry from the process chemistry supply system 130, or a combination thereof in a processing space 112 that may be enclosed in an inner wall, lid, or other closure structure 113. Additionally, processing chamber 110 can include an upper chamber assembly 114, and a lower chamber assembly 115.

The upper chamber assembly 114 can comprise a heater (not shown) for heating the processing chamber 110, the substrate 105, or the processing fluid, or a combination of two or more thereof. Alternately, a heater is not required. Additionally, the upper chamber assembly can include flow components (not shown) for flowing processing fluid through the processing chamber 110, and particularly through the processing space 112, which surrounds the substrate 105 and the processing chamber 110. In one example, a circular flow pattern can be established, and in another example, a substantially linear flow pattern can be established. Alternately, the flow components for flowing the fluid can be configured differently to affect a different flow pattern.

The lower chamber assembly 115 can include a platen 116 configured to support substrate 105 and a drive mechanism 118 for translating the platen 116 in order to load and unload substrate 105, and seal lower chamber assembly 115 with upper chamber assembly 114. The platen 116 can also be configured to heat or cool the substrate 105 before, during, and/or after processing the substrate 105. Additionally, the lower assembly 115 can include a lift pin assembly for displacing the substrate 105 from the upper surface of the platen 116 during substrate loading and unloading.

A transfer system (not shown) can be used to move a substrate into and out of the processing chamber 110 through a slot (not shown). In one example, the slot can be opened and closed by moving the platen, and in another example, the slot can be controlled using a gate valve.

The substrate can include semiconductor material, metallic material, dielectric material, ceramic material, or polymer material, or a combination of two or more thereof. The semiconductor material can include Si, Ge, Si/Ge, or GaAs. The metallic material can include Cu, Al, Ni, Pb, Ti, and Ta. The dielectric material can include silica, silicon dioxide, quartz, aluminum oxide, sapphire, low dielectric constant materials, TEFLON, and polyimide. The ceramic material can include aluminum oxide, silicon carbide, etc.

The processing system 100 can also comprise a pressure control system (not shown). The pressure control system can be coupled to the processing chamber 110, but this is not required. In alternate embodiments, pressure control system can be configured differently and coupled differently. The pressure control system can include one or more pressure valves (not shown) for exhausting the processing chamber 110 and/or for regulating the pressure within the processing chamber 110. Alternately, the pressure control system can also include one or more pumps (not shown). For example, one pump may be used to increase the pressure within the processing chamber, and another pump may be used to evacuate the processing chamber 110. In another embodiment, the pressure control system can comprise seals for sealing the processing chamber. In addition, the pressure control system can comprise an elevator for raising and lowering the substrate and/or the platen.

Figure 1A:
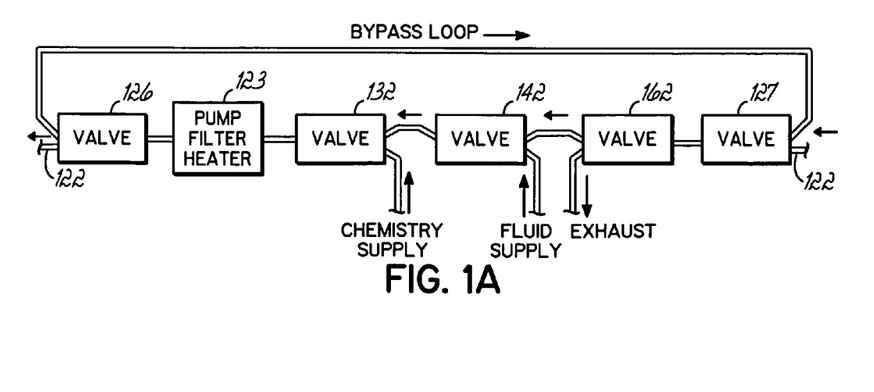
FIG. 1A is a detailed diagram of one embodiment of the recirculation system portion marked 1A in FIG. 1.

There are several places in the systems described above and other systems of these types where flow direction control is useful. Some of these are illustrated in FIG. 1A. For example, the processing system 100 can comprise an exhaust control system 160. The exhaust control system 160 can be coupled to the processing chamber 110 via the line 122, but this is not required. In alternate embodiments, exhaust control system can be configured differently and coupled differently. The exhaust control system 160 can include an exhaust gas collection vessel (not shown) and can be used to remove contaminants from the processing fluid. Alternately, the exhaust control system can be used to recycle the processing fluid. Flow can be diverted from the flow line 122 to the exhaust control system 160 by use of a flow diversion valve 162. Such a valve may open a line to the exhaust system and totally shut off flow along the line 122, but total shut off is not necessary in many cases. Similarly, clean processing fluid can be introduced into line 122 from fluid supply system 140 through valve 142.

An example of the use of a flow diversion valve which is not 100% shut off tight would be for secondary branches which may be used to inject chemistry into the high pressure environment, such as from chemistry supply system 130 through valve 132 in FIG. 1A, and then recirculate the chemistry-fluid mixture in a local loop 125. Recirculation can be switched from the chamber 110 through the local loop 125 and back with flow diverter valves, such as valve 126, which diverts flow from the main line 122 to the local loop 125, and valve 127, which combines flow from local loop 125 back to line 122. Note that pump, filter and heater referred to above may be located between the valves 127 and 126, but they can be located elsewhere, for example elsewhere in the line 122. In case of these flow diverter valves, a small amount of leakage into the main line 122 may not be important as mixing will take place after certain amount of mixing has occurred within the secondary branch 125. Each of the valves 126, 127, 132, 142 and 162 can be controlled by signals from the controller 150.

Another possible use for flow diverter valves is for directing flow to different areas of the wafer 105. If local high velocity jets are required for cleaning a wafer, it may not be practical to generate very high pressure gradients within the entire area of the tool, for example, because of filtration concerns. Such high velocity jets may be directed to only certain areas of the wafer 105 at a time. In this case, one or more flow diversion valves may be activated to move the high velocity flow to different areas of the wafer for cleaning. Small leakages are insignificant within the valve, as only relatively higher velocity flow is required within the tool to do the processing. Although the leakage will reduce the available flow rate to some degree, this might not outweigh the benefits of a high flow valve solution. An example of the placement of such a valve is the valve 172 illustrated in FIG. 2.

Figure 2:
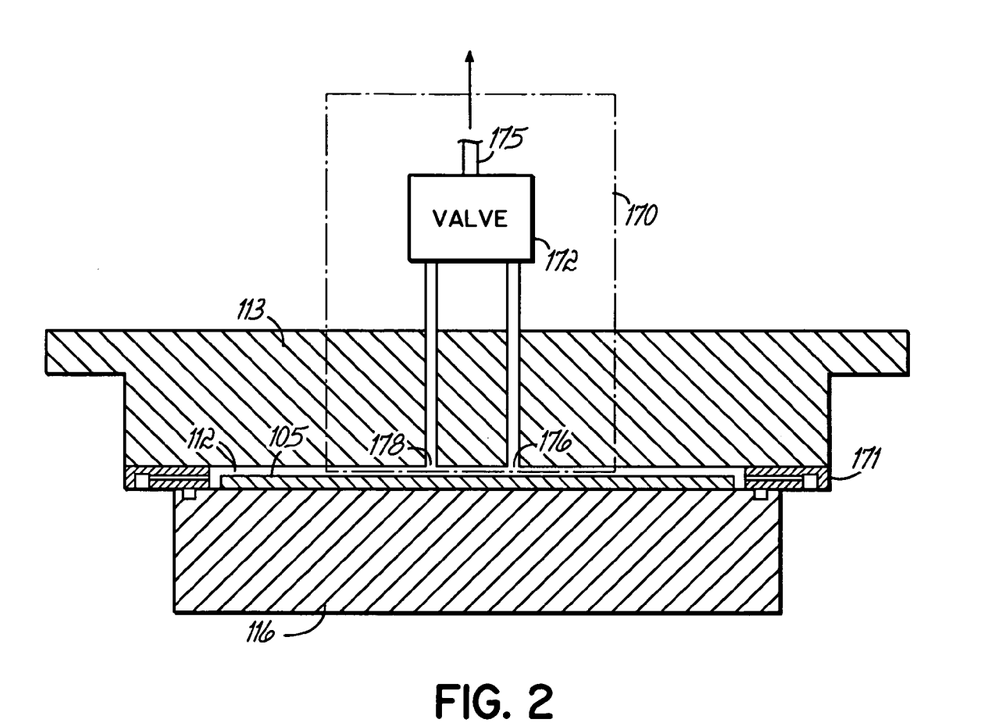
FIG. 2 is an enlarged diagram of a portion of the chamber of the system of FIG. 1 according to certain embodiments of the invention.

FIG. 2 is similar to FIG. 5 described in pending U.S. patent application Ser. No. 09/912,844 (US Patent Application Publication No. 2002/0046707 A1), entitled "High pressure processing chamber for semiconductor substrates", and filed on Jul. 24, 2001, which is incorporated herein by reference in its entirety.

As illustrated in FIG. 2, the processing space 112 may be in the form of a wafer cavity enclosed by the lid 113 over the wafer 105 on the platen 116. Processing fluid may be brought into the cavity 112 through a spacer-injection ring 171 and preferably exhausted through a two port outlet 170. The two port outlet 170 can include a flow diverter valve 172, which can be alternated between a first position and a second position to switch flow from the cavity 112 between first and second exhaust ports 176 and 178 to a return port 175.

The valves 126, 127, 132, 142 and 162 in FIG. 1A have all been referred to as flow diversion valves. These valves can be structurally similar. Some, namely valves 126 and 162 function to divert flow from a single inlet to one of two alternative outlets by switching an internal valve element. Others of these valves, namely valves 127, 132 and 142 operate in reverse, by admitting fluid from one of two alternative inlets to a single outlet by switching a similar valve element. The valve 172 of FIG. 2 operates in a similar direction to that of valves 127, 132 and 142.

Figure 3:
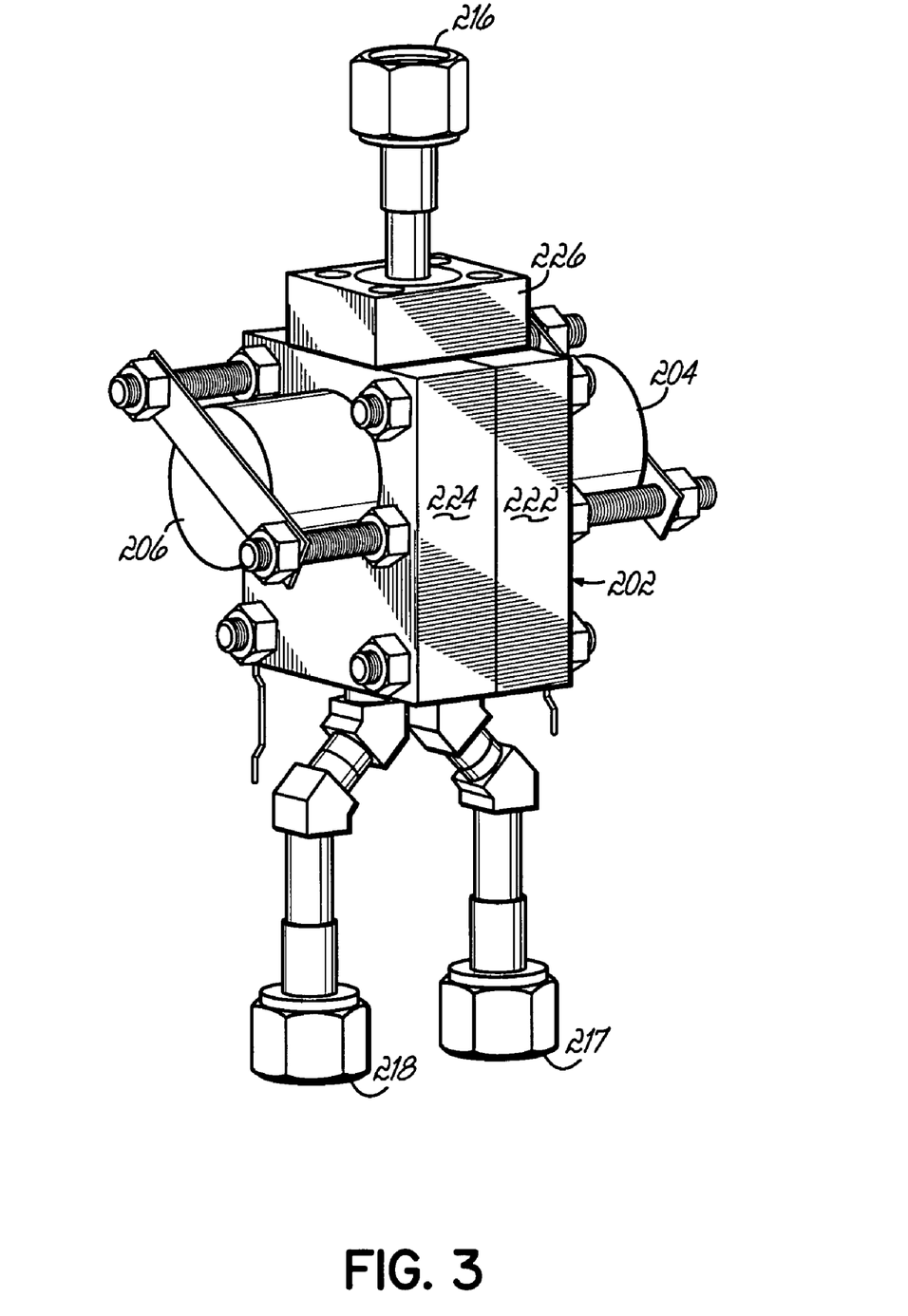
FIG. 3 is a perspective view of one embodiment of a diverter valve of the systems of FIG. 1A and FIG. 2.
Figure 4:
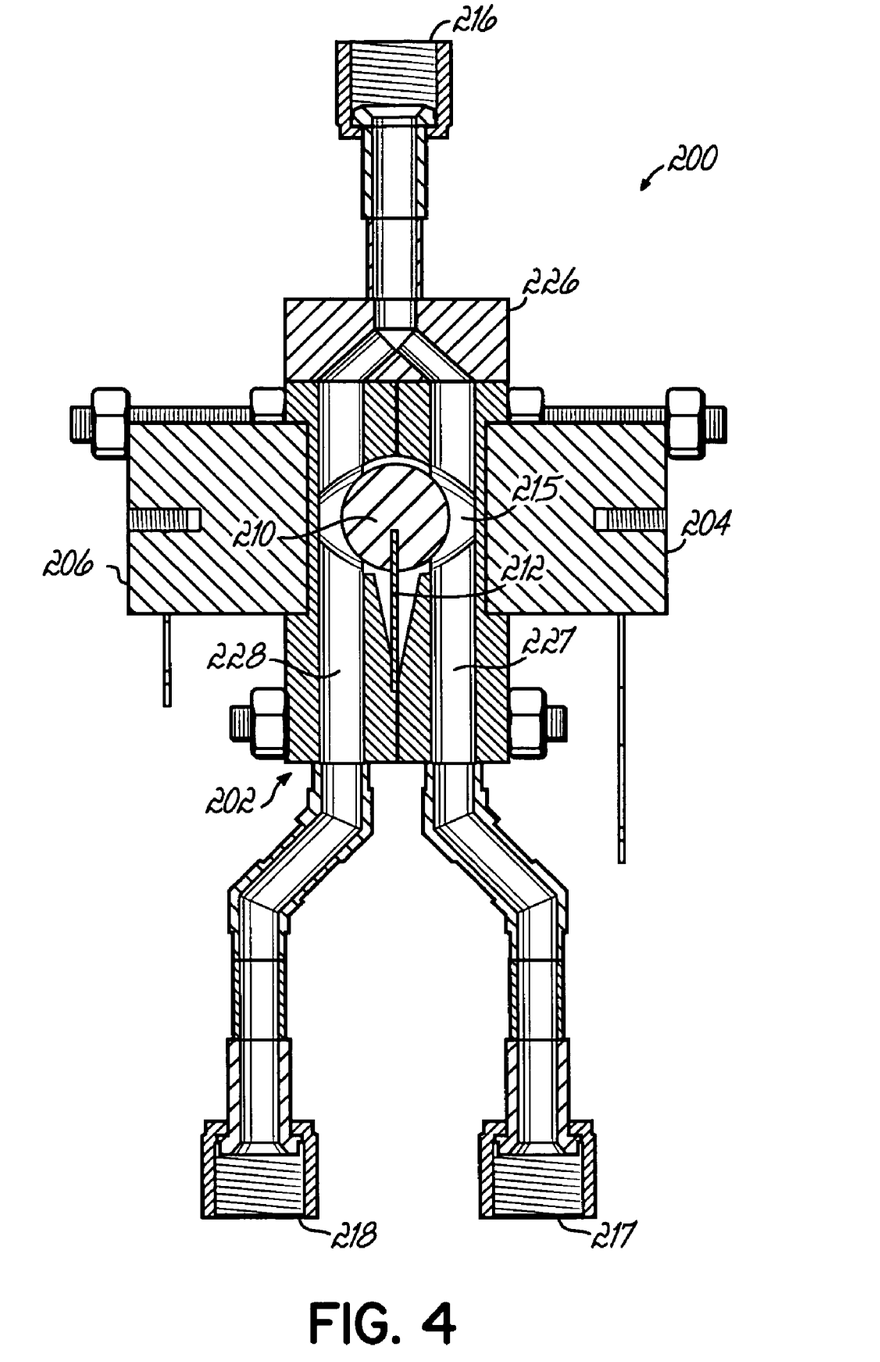
FIG. 4 is a cross sectional view of the valve of FIG. 3.
Figure 6:
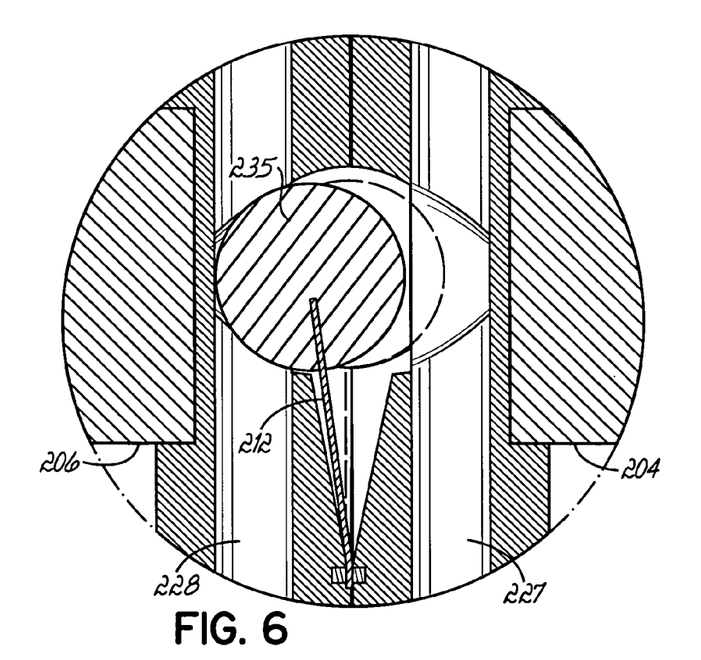
FIG. 6 is a sectional view of a portion of the valve of FIGS. 3 and 4.

FIG. 3 and FIG. 6 illustrate a non-rubbing, non-contact flow diverting valve 200 according to one embodiment of the invention. The valve 200 can be used in the various locations described above in semiconductor wafer high pressure processing tools, and are particularly useful in SCCO2 processing systems. The valve 200 includes a valve body 202 having two electromagnets 204 and 206 positioned on opposite sides of the valve body 202. Internally to the valve body 202, as illustrated in FIG. 4, is a cavity 215 in which is mounted a spherical valve element or ball 210. The ball 210 is edge welded to a thin metal sheet or plate 212. The metal sheet 212 acts as a spring and a stabilizer for the ball 210. The valve body 202 has a common port 216 and two switched ports 217 and 218. The ball 210 as well as the sheet 212 are positioned in the cavity 215 to block flow between the two switched ports 217 and 218.

The ball 210 itself is a composite formulated for use in this valve. Since electromagnets can only operate on magnetic metals, the ball 210 is formed of a magnetic grade steel. Since ferrous metals are generally poor performers with respect to corrosion, stainless steel or some other non-corrosive material is preferably in contact with the working fluid. The ball 210 is, to serve this purpose in this embodiment, composed of a thin shell of austenitic stainless steel welded around a ferrous metal interior ball. Martinsitic stainless steels could also be used. While the corrosion protection and the level of magnetic attraction they provide are usually less good, they could be acceptable in some applications, as can other materials possessing the desired properties.

As illustrated in FIGS. 3 and 4, the valve body 202 is formed of two blocks, 222 and 224, into which the cavity 215 is formed. The blocks 222 and 224 are bolted together. Channels 227 and 228 are respectively formed in the blocks 222 and 224 to connect the respective switched ports 217 and 218 to the common port 216. The ball 210 is positioned in the cavity 215, and the channels 227 and 228 are shaped, to alternately block flow between one of the switched ports 217,218 and the common port 216, while permitting flow between the other of the switched ports 217,218 and the common port 216. Activation of magnet 204 closes port 217 and opens port 218 to port 216, while activation of magnet 206 closes port 218 and opens port 217 to port 216. The two inlet ports 217 and 218 are shown communicating with the channels 227 and 228 the blocks 222 and 224, respectively, of the body 202 while the one common port 216 is shown communicating with the cavity 215 through the top of an exit plate 226 on the top of the body 202. Straps hold electromagnets 204 and 206 in place.

Figure 5:
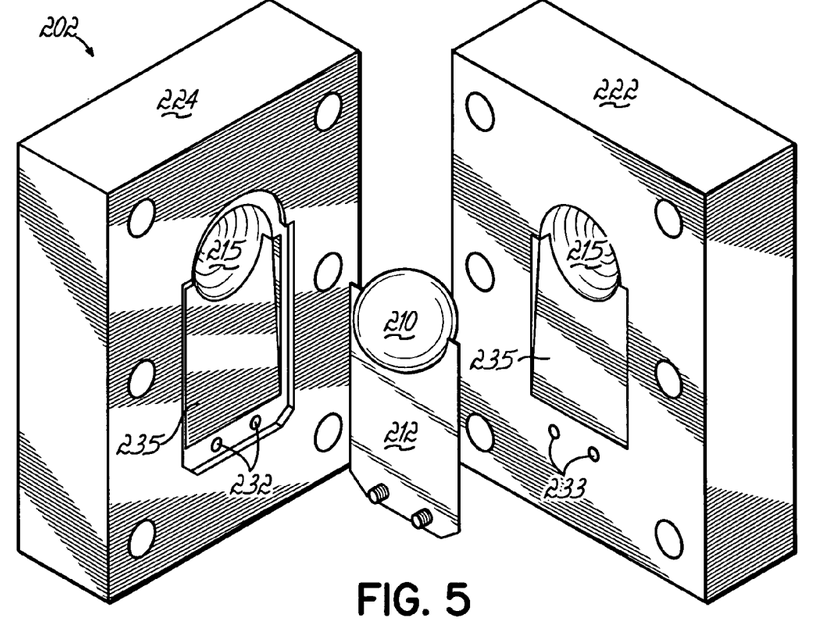
FIG. 5 is a disassembled view of a portion of the valve of FIGS. 3 and 4.

In FIG. 5, the two blocks 222 and 224 that make up the valve body 202 are shown disassembled. The ball 210 and very thin support plate 212 can be seen with the cavity 215 formed in the blocks 222 and 224. The two blocks or body halves 222,224 of the valve 200 have the relief cavity 215 formed therein to accept the ball 210 when it is flexed on the metal support plate 212 by the force of one of the magnets 204,206. Two pin holes 232 are formed in the cavity 215 of one block 224 and two pin holes 233 are formed in the other block 222 to receive two pins 234 that are pressed into the thin spring support plate 212. A tapered recess 235 at the bottom of the cavity 215 for the spring plate 212 is also shown. The body half or block 222 is similar to the block 224 with one exception being that an o-ring groove (not shown) is added to create a seal between the body halves 222,224.

Additional relief for the bottom of the spring support plate 212 is provided in one of the blocks, for example, block 224. For simplicity of machining, the opposite half does not require this relief, which means the spring plate 212 and ball 210 will be off center by half the thickness of the spring plate 212, but that is not significant enough to cause any significant difference in performance. Of course, matching reliefs could be present in both blocks 222,224 to exactly center the spring plate 212.

The two pins 232 in the spring plate 212 are used for positioning the ball unit and the two body halves 222,224, as well for as stabilizing the spring support plate 212 from moving out of position during use. The channels 227,228 are shown with portions that form two flow streams that connect into a single common port. The blocks 222 and 224, as well as exit block 226, are conically relieved to expose a tubular stub suitable for the welding thereto of the tube extensions to the ports 216–218.

In operation, in a start up mode, the valve 200 is unpowered. When unpowered, the ball 210 assumes will find a natural position in the center of the valve cavity 215 blocking neither port 217 nor 218. If flow were present in this unpowered condition, the ball 210 could begin to oscillate due to the flow creating unsteady low pressure regions on the side of the ball 210. The spring stiffness of plate 212 and the flow rate of fluid through the valve 200, as well as the fluid properties, are factors that determine the rate of vibration under the no-power condition.

Once either one of the electromagnets 204,206 is switched on, the ball 210 is drawn toward it. The spring plate 212 flexes in an arc, allowing the ball 210 to move toward the actuated electromagnet. Ideally, the stiffness of the plate 212 is sufficient to counterbalance the force from the electromagnet such that the plate never comes into contact with the arc in the body half. Alternatively, the spring flexure of plate 212 can be such that the ball 210 does not come into contact with the body half, so that, instead, the spring plate 212 would rest against the body half at full flexure, producing a gentle contact, that could be beneficial in resulting in fewer particulates being generated. When flow direction needs to be switched, the opposite electromagnet 204,206 is turned on and the other electromagnet is switched off. The ball 210 will then be drawn toward the opposite side of the valve cavity 215, shutting off the previously open flow port 217,218 and opening the other.

A number of other optional features may be employed. For example, the electromagnets 204,206 may be ramped up and ramped down in force for optimum control. Both electromagnets may be actuated at the same time during the transition period, for example with overlapping actuation periods, when switching flow ports to produce smooth control of the ball 210 and spring plate 212. Voltage and current can also be regulated to the electromagnets 204,206 in such a way as to more precisely control the flex of the spring plate 212. The flow rate and fluid viscosity also play a role in the deflection characteristics of the spring plate 212, and may vary during operation.

As addition optional features, inputs of flow meters and other diagnostics can be input into controller 150 or another controller, which can calculate results in real time and closed loop mode, and output a signal to the electromagnets 204, 206 to keep the position of the ball 210 in the correct location. A small hole or two can be cross-drilled from the inlet port to the very bottom of the arc 235 on the body half 222,224 to allow incoming flow to sweep away the dead flow area that could result at the junction of the body halves 222,224 and the spring plate 212.

As further optional features, for example, the ball 210 can contain a high strength permanent magnet instead of an iron based alloy, such that magnetic attraction between the ball 210 and the electromagnets 204,206 is enhanced. The ball 210 can contain a high strength permanent magnet, such that magnetic repulsion between the ball and the electromagnets 204,206 is utilized rather than magnetic attraction for actuation. Further, sensors can be incorporated to sense the position of the ball to indicate switching. A sensor can be provided to provide electrical feedback from the electromagnet indicating presence within its control field.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A valve for switching the flow of high pressure processing fluid between a common port and alternative switched ports in a semiconductor processing system, the valve comprising:
   a valve body having a cavity therein, a common port coupled to the cavity and at least two switched ports coupled to the cavity;
   a valve element moveable in the cavity between alternative positions including:
      a first position at which the element blocks flow of the high pressure fluid between the common port and a first one of the switched ports and permits flow of the high pressure fluid between the common port and a second one of the switched ports, and
      a second position at which the element blocks flow of the high pressure fluid between the common port and the second one of the switched ports and permits flow of the high pressure fluid between the common port and the first one of the switched ports;
   at least two actuators mounted on said valve body and magnetically coupled to said valve element when activated in response to a control signal, said actuators including a first actuator configured and positioned to move said element to said first position when activated and a second element configured and positioned to move said element to said second position when activated;
   a convex spool formed of a magnet or ferromagnetic material or a combination thereof;
   a plate of spring material having said spool fixed to one end thereof and being fixed at the other end thereof to the valve body;
   two electromagnets mounted on opposite sides of the valve body with the cavity and spool in between;
   said valve body having:
      a first channel providing a fluid flow path between said first switched port and said cavity at said first position;
      a second channel providing a fluid flow path between said second switched port and said cavity at said second position;
      a third channel providing a fluid flow path between said common port and said cavity at said first position;
      a fourth channel providing a fluid flow path between said common port and said cavity at said second position; and
   said spool being configured to seat against and block said first and third channels at said first position and to seat against and block said second and fourth channels at said second position.

* * * * *